April 10, 1945.  A. P. O'NEILL  2,373,332
SAFETY DEVICE
Filed Jan. 17, 1944
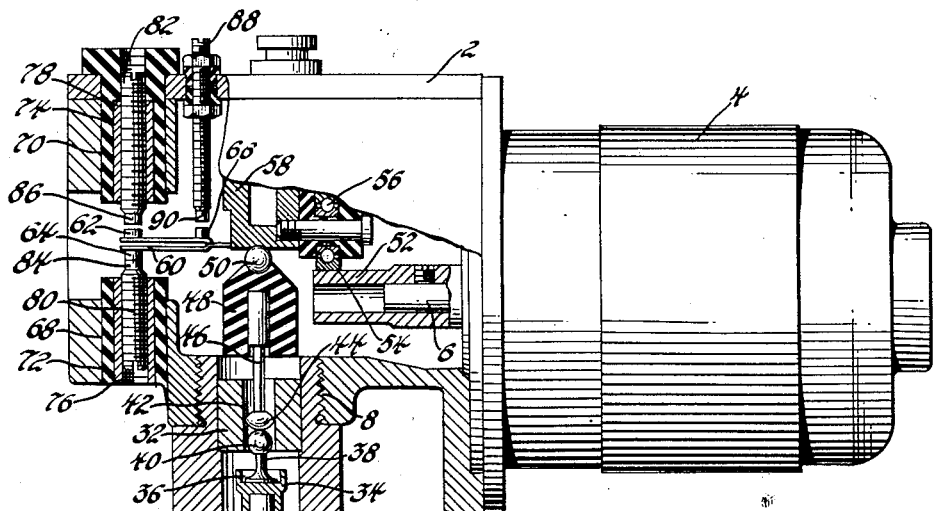
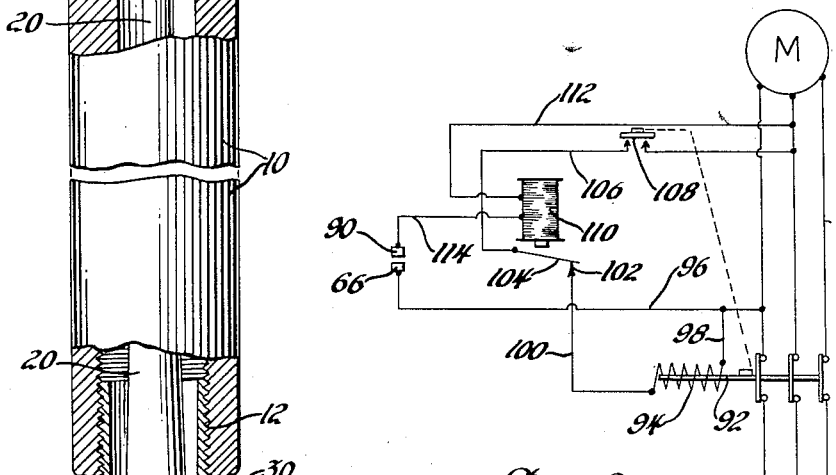
Fig. 1
Fig. 2
Inventor
Arthur P. O'Neill
By
Blackmore, Spencer & Flint
Attorney Patented Apr. 10, 1945

2,373,332

UNITED STATES PATENT OFFICE 2,373,332

SAFETY DEVICE

Arthur P. O'Neill, Pontiac, Mich., assignor to General Motors Corporation, Detroit, Mich., a corporation of Delaware Application January 17, 1944, Serial No. 518,562

2 Claims. (Cl. 90—62)

This invention relates to profiling or contour duplicating means and more particularly to safety means applicable to the tracer and cutter controls so that work will not be damaged or ruined by incorrect movement of the control means.

In duplicating equipment in general, there is mounted upon movable means a model of the contour which it is desired to reproduce and in spaced relation thereto a blank in which this contour is to be reproduced. Adjacent the model there is stationarily mounted a tracer head or following means and adjacent the blank is a router or cutter to cut into the blank different distances as determined by the controlling movement of the tracer head. There is also provided means for driving the movable means supporting the model and the blank in one or two main feed directions and also to superimpose upon this general direction of travel corrective variations at right angles thereto by having some mechanism in the tracer head control this feed at right angles and provide relatively short feed distances for reproducing the contour.

For example, if a model was mounted upon a movable plate and a tracer was so mounted as to follow along one side of the model as relative longitudinal feed was produced, then the irregularities in the side of the model would cause the tracer tip to move at right angles to the direction of the main feed and by suitable switching means for the corrective drive, move the support for the model and blank to maintain the tracer only lightly in contact with the side of the model, at the same time accurately reproducing this surface on the side of the blank. If the other major dimension became controlling, then instead of longitudinal main feed, a transverse main feed might be desirable, the tracer tip again moving at right angles this time to the transverse feed and still reproducing the side of the model. However, in utilizing machines for the various directions of main feed, mechanisms similar to milling machines are often used and under certain circumstances in changing from one direction of main feed to another, the manual operator might close the wrong switch, causing main feed in a direction opposite to that which he intended. Unless the piece is to be ruined, it would be necessary to provide some safety means to deenergize the system in such cases when the tracer head calls for too large a corrective movement.

It is therefore an object of my invention to provide safety means in duplicating means whereby if the corrective distance called for is more than a predetermined amount, the whole mechanism will be deenergized.

It is a further object of my invention to provide safety means incorporated in a tracer head mechanism.

It is still a further object of my invention to provide safety means in profiling mechanism whereby an excess of pressure will cause deenergization of the system.

With these and other objects in view which will become apparent as the specification proceeds, the embodiments of my invention will be best understood by reference to the following specification and claims and the illustrations in the accompanying drawing, in which:

Figure 1 shows a side elevation of a tracer head incorporating my invention, parts being broken away and shown in section;

Figure 2 is a circuit diagram showing the incorporation of my invention in the control system.

Referring now more specifically to Figure 1, the tracer head shown therein is one utilizing a very rapidly vibrating contact member. There is provided a frame 2 which is supported from the main duplicating machine by any suitable means, not shown, and which itself supports a small high speed motor 4 driving a shaft 6. In one side of the frame there is provided a tapped opening 8 into which is threaded the end of a long cylindrical member 10 for supporting the follower or tracer rod which will engage the model. The lower end of the cylindrical member 10 is in turn internally threaded as at 12 and supports a hollow plug 14 whose inner surface is reduced at its lower end to form a semi-spherical portion 16 to support the bulbous portion 18 of a rod 20 so that the same may pivot thereabout throughout a limited range.

A vertical slot 22 is provided in one side of this bulbous portion and a pin 24 carried by the plug 14 projects thereinto to prevent rotary movement of the rod 20 but to provide for its pivotal movement about this point. The remainder of the rod 20 projects through a tapered opening 26 in the end of the plug 14 and is cored out to carry a follower arm 28 which actually engages the model. A locking nut 30 threaded onto the shank of the plug 14 locks it to the end of the cylindrical member 10 at the desired position.

The upper end of the cylindrical member 10 carries therein a centrally apertured plug 32 and the upper end of the rod 20 carries a small cap member 34 having a recessed upper face 36 in which a collar button shaped member 38 sits in substantially vertical position, the lower flat surface of the member 38 being seated within the recess 36 and the upper spherical head 40 of the same projecting up into the central aperture 42 of the plug 32 and adapted to engage the circular head 44 on the lower end of a supporting rod 46 for an insulating supporting member 48 carrying on its upper end a ball bearing pivot 50.

The shaft 6 of the motor has secured thereto an extension 52 which has on its outer end an eccentric 54 which is adapted to bear against a roller bearing member 56 carried by a movable frame 58, the latter being pivotally mounted upon the ball 50 and being held thereagainst by suitable resilient means, not shown, within the casing. This frame 58 has secured thereto a resilient contact supporting member 60 carrying contacts 62, 64 and 66. Since frame 58 pivots around ball 50, when the shaft 6 of the motor 4 rotates, the member 60 will be moved up and down by the eccentric or vibrated at a very high rate a short distance up and down for a purpose to be described.

The frame 2 also is provided with insulated aligned openings 68 and 70 within each of which is mounted an insulating sleeve 72 and 74 and carries in it a threaded sleeve 76 and 78. Within each of the threaded sleeves is adjustably supported a screw-threaded member 80 and 82. These two screw-threaded members are headed up to form contacts 84 and 86 to cooperate with the vibrating or movable contacts 64 and 62 respectively. Provision is of course made for connecting the threaded sleeves 76 and 78 into the electric control circuit. The frame 2 also insulatably supports a further adjustably mounted threaded rod 88 which projects down parallel to member 82 and carries at its internal end a contact member 90 cooperating with spaced contact 66 on the member 60. In normal operation the device is mounted as shown in a substantially vertical position, and the actual contact follower 28 not initially in contact with any surface. The motor 4 is then energized and the contact supporting member 60 therefore vibrates between contacts 84 and 86. Contact 84 is now adjusted in position so that the circuit between it and 64 is not broken, though arm 60 is vibrating, but the movement is absorbed by the flexing of the arm. The position of contact 86 is adjusted so at this time no contact is made therewith, but it is of course only slightly spaced from the uppermost position assumed by the vibrating contact 62. Contact 90 is also adjusted so that it is slightly further from its cooperating contact 66 than 86 is from 62.

The main feed of the machine is then started and since the lower two contacts 64 and 84 are in contact, the corrective feed moving the plate carrying the model and blank now tends to move that, let us say to the left, until member 28 contacts the side of the surface to be reproduced, at which time rod 20 will be slightly tilted, cocking the collar button member 38 up on one edge to a degree dependent upon the movement imparted thereto which will raise the pivot or fulcrum of the frame 58. This will cause the contacts 64 and 84 to be opened during oscillation and the contacts 62 and 86 to be closed which will cause the feed means controlled thereby to be reversed in direction and the work table of the machine moves the work out away from the tracer arm 28. Of course as soon as it thus moves, rod 20 assumes its former position and the feed means is immediately again reversed and continues this hunting process as the tracer arm follows down the side of the surface.

If a very great change in contour is encountered, such as should be compensated by superimposed manual control or a change in the direction of the main feed, the arm 28 will be pushed by much greater force to one side, cocking the button member 38 to a higher position, and in this case unless some means is provided the tracer and cutter may not be able to follow the contour correctly at the desired speed and the feed should be shut off. In such instances with an excessive raise, contact 66 will engage cooperating contact 90, in which case means will be energized to deenergize the whole system and allow the operator to take over. Therefore, ordinarily either contacts 64, 84 or contacts 62, 86 are causing minute energization of the feeding means controlling the position of the worktable relative to the tracer and cutter heads, but any abnormal force exerted on the tracer head will cause the safety switch contacts 66, 90 to close, deenergizing the machine, and the operator can then check to see what the difficulty is, make his adjustments and the piece being cut will not be ruined.

Figure 2 shows a circuit diagram for the various contacts which have been described previously and in that case motor M is the main feed motor for the machine. This is energized from a suitable supply of power indicated as "line" in which there is provided a circuit breaker 92 which is held in operative or closed position by coil 94. The coil 94 is connected to one of the lines through connecting line 96 and line 98 and has its other terminal connected through line 100 to a stationary contact 102 of a switch whose movable contact 104 is connected through line 106 to a manually operated switch 108 and thence to a second supply line. The position of movable contact 104 is controlled by a relay coil 110 which is connected through line 112 to one of the supply lines and has its opposite terminal connected through line 114 to contact 90, the cooperating contact 66 of which is connected through line 96 back to the first-named supply line.

It will be clear from this disclosure that under ordinary operations the manual switch 108 being closed, the circuit to the energizing coil 94 of the circuit breaker will be closed and current supplied to the driving motor M. However, if abnormal conditions arise, switch 66, 90 closes to energize relay 110, opening switch 102, 104, and thus breaking the circuit to coil 94 whose contacts will therefore fall out, opening the supply circuit to the motor M. Manual switch 108 is opened by circuit breaker deenergization, requiring the operator to close these contacts before restarting the system.

It is therefore evident from the foregoing that I have provided a safety system incorporated in profiling means which can be adjusted and set to any degree of sensitivity depending upon the desire of the operator, and which will prevent any abnormal conditions from continuing to such an extent as to spoil a piece which is being reproduced.

I claim:

1. In a tracer head for following contours, a pair of oppositely disposed adjustable contacts, a motor driven distortable arm adjustably pivotally mounted to oscillate between the contacts and having cooperating contacts thereon to form switching means to control the contour movement, a spaced adjustable contact, a further contact on the arm to cooperate therewith to form a safety switch, said last named switch being closed by additional distortion of the arm beyond normal switch closing action of the first-named control switches, a movable pivot for the distortable oscillating arm and tracer rod means acting upon the pivot to cause movement of the same.

2. In a tracer head for following contours having oppositely disposed adjustable contacts cooperating with oscillating contacts vibrating therebetween to control the normal feed of the contour, a distortable arm supporting the vibrating contacts having a movable pivot, eccentric rotatable means to vibrate said arm a follower rod engaging the pivot to move the same and a safety switch comprising an adjustable contact spaced relatively further from the distortable arm than the control contacts and an additional contact cooperating therewith on the arm so that as the follower rod causes the arm to be moved depending on the contour, the control contacts will be closed or opened and excessive movement of the rod will cause actuation of the safety contacts.

ARTHUR P. O'NEILL.